US010862119B2

United States Patent
Choi et al.

(10) Patent No.: US 10,862,119 B2
(45) Date of Patent: Dec. 8, 2020

(54) CATHODE ACTIVE MATERIAL AND MANUFACTURING METHOD THEREOF

(71) Applicant: ECOPRO BM CO., LTD., Cheongju-si (KR)

(72) Inventors: Moon Ho Choi, Cheongju-si (KR); Jong Hwan Park, Cheongju-si (KR); Gyeong Jae Heo, Cheongju-si (KR); Hyun Jong Yu, Cheongju-si (KR); Kyoung Jun Lee, Cheongju-si (KR); Jung Bae Park, Cheongju-si (KR); Seung Hyun Choi, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 0 days.

(21) Appl. No.: 16/191,859

(22) Filed: Nov. 15, 2018

(65) Prior Publication Data
US 2019/0148725 A1    May 16, 2019

(30) Foreign Application Priority Data

Nov. 15, 2017  (KR) .................. 10-2017-0152449
Nov. 15, 2017  (KR) .................. 10-2017-0152450
(Continued)

(51) Int. Cl.
*H01M 4/505*    (2010.01)
*H01M 4/525*    (2010.01)
(Continued)

(52) U.S. Cl.
CPC ............ *H01M 4/505* (2013.01); *C01G 45/02* (2013.01); *C01G 45/1242* (2013.01); (Continued)

(58) Field of Classification Search
CPC ...... H01M 4/505; H01M 4/362; H01M 4/364; H01M 4/366; H01M 4/525;
(Continued)

(56) References Cited

U.S. PATENT DOCUMENTS

| 6,040,090 A | 3/2000 | Sunagawa et al. |
| 2011/0311869 A1 * | 12/2011 | Oh ...................... H01M 4/131 429/211 |

FOREIGN PATENT DOCUMENTS

| DE | 102017215146 A1 * | 2/2019 | ............ H01M 4/505 |
| EP | 0 918 041 B1 | 11/2010 | |

(Continued)

OTHER PUBLICATIONS

English translation of DE-102017215146-A1 (Year: 2019).*
English translation of KR-20160015779-A (Year: 2016).*

*Primary Examiner* — Christopher P Domone
*Assistant Examiner* — Kimberly Wyluda
(74) *Attorney, Agent, or Firm* — Saliwanchik, Lloyd & Eisenschenk

(57) ABSTRACT

The present invention relates to a cathode active material for a secondary battery and a preparation method thereof, and more particularly, to a lithium composite oxide including a secondary particle formed as primary particles cohere, in which a manganese (Mn) oxide is present in the periphery of the primary particles, a concentration of an Mn oxide in the primary particle has a concentration gradient from the center of the primary particle to a surface of the particle, a concentration of an Mn oxide in the secondary particle has a concentration gradient from a surface of the secondary particle to the center thereof, and a lithium ion migration path is formed in the primary particle, and a preparation method thereof. A secondary battery including the cathode
(Continued)

active material for a secondary battery may have high safety, while exhibiting high capacity and high output.

11 Claims, 17 Drawing Sheets

(30) Foreign Application Priority Data

Nov. 15, 2017 (KR) ........................ 10-2017-0152451
Oct. 23, 2018 (KR) ........................ 10-2018-0126427

(51) Int. Cl.
*H01M 10/0525* (2010.01)
*H01M 4/36* (2006.01)
*C01G 45/12* (2006.01)
*C01G 53/00* (2006.01)
*C01G 53/04* (2006.01)
*C01G 45/02* (2006.01)
*H01M 4/02* (2006.01)
*H01M 10/052* (2010.01)

(52) U.S. Cl.
CPC ......... *C01G 45/1257* (2013.01); *C01G 53/04* (2013.01); *C01G 53/42* (2013.01); *H01M 4/362* (2013.01); *H01M 4/364* (2013.01); *H01M 4/366* (2013.01); *H01M 4/525* (2013.01); *H01M 10/0525* (2013.01); *C01P 2002/52* (2013.01); *C01P 2002/54* (2013.01); *C01P 2002/72* (2013.01); *C01P 2002/85* (2013.01); *C01P 2004/50* (2013.01); *C01P 2004/82* (2013.01); *H01M 10/052* (2013.01); *H01M 2004/028* (2013.01)

(58) Field of Classification Search
CPC ........... H01M 10/0525; H01M 10/052; H01M 2004/028; C01G 45/02; C01G 45/1242; C01G 45/1257; C01G 53/04; C01G 53/42; C01P 2002/52; C01P 2002/54; C01P 2002/72; C01P 2002/85; C01P 2004/50; C01P 2004/82
See application file for complete search history.

(56) References Cited

FOREIGN PATENT DOCUMENTS

| | | | |
|---|---|---|---|
| JP | 3890185 B2 | | 3/2007 |
| KR | 10-2005-0083869 A | | 2/2005 |
| KR | 20160015779 A | * | 2/2016 |

* cited by examiner

CATHODE ACTIVE MATERIAL AND MANUFACTURING METHOD THEREOF

CROSS-REFERENCE TO RELATED APPLICATIONS

This application claims the benefit under 35 U.S.C. § 119 of Korean Patent Application Nos. 10-2017-0152449, filed Nov. 15, 2017; 10-2017-0152450, filed Nov. 15, 2017; 10-2017-0152451, filed Nov. 15, 2017; and 10-2018-0126427, filed Oct. 23, 2018, the disclosures of each of which are incorporated herein by reference in their entirety.

BACKGROUND OF THE INVENTION

Field of the Invention

The present invention relates to a cathode active material for a secondary battery and a preparation method thereof, and more particularly, to a lithium composite oxide including a secondary particle formed as primary particles cohere, in which a manganese (Mn) oxide is present in the periphery of the primary particles, a concentration of a Mn oxide has a concentration gradient from the center of the primary particle to a surface of the particle, a concentration of a Mn oxide has a concentration gradient from a surface of the secondary particle to the center thereof, and a lithium ion migration path is included in the primary particle, and a preparation method thereof.

Description of the Related Art

Lithium secondary batteries, which were developed in early 1990s and have so far been used, are compact, light-weight, and large-capacity batteries spotlighted as power sources for portable devices. The lithium secondary batteries have advantages in that an operating voltage is high and energy density is significantly high, as compared with conventional batteries such as nickel-hydrogen (Ni—MH), nickel-cadmium (Ni—Cd), sulfuric acid-lead batteries using an aqueous electrolyte. In particular, recently, research into a power source for an electric vehicle in which an internal combustion engine and a lithium secondary battery are hybridized have actively been conducted in the United States, Japan, Europe, and the like.

Manufacturing large-sized batteries for electric vehicles using lithium secondary batteries has been considered in terms of energy density, but nickel-metal hydride batteries are still used in electric vehicles in consideration of safety. Lithium secondary batteries have limitations to be applied to electric vehicles due to high price and safety issues. Particularly, when lithium secondary batteries including currently commercialized LiCoO2 or LiNiO2 as a cathode active material are heated in an over-charged state, a structure thereof is rapidly changed. Thereafter, due to the structural change, oxygen in a lattice is emitted to result in an unstable crystal structure due to delithiation at the time of charging. That is, the commercialized lithium secondary batteries are very vulnerable to heat.

In order to improve this, attempts have been made to replace a portion of nickel with a transition metal element to further increase a heating start temperature or to inhibit rapid heating. A material of LiNi1–xCoxO2 (x is 0.1 to 0.3) in which a portion of nickel is replaced with cobalt exhibits excellent charge/discharge characteristics and life characteristics, but still involves the problem of thermal stability. In addition, Li—Ni—Mn composite oxides in which manganese, instead of nickel, is partially substituted or Li—Ni—Mn—Co composite oxides in which nickel is substituted with manganese and cobalt and techniques related to preparation thereof have also been developed. In this regard, Japanese Patent No. 3890185 discloses a new concept of a cathode active material which creates a solid solution by uniformly dispersing manganese and nickel compounds at an atomic level, rather than a concept of partially substituting a transition metal for LiNiO2 or LiMnO2. European Patent No. 0 918 041 and U.S. Pat. No. 6,040,090 disclose a Li—Ni—Mn—Co composite oxide in which nickel is substituted with manganese and cobalt. The composite oxide disclosed in this document has improved thermal stability, as compared with a material including only nickel and cobalt, but it can be seen that it does not completely solve the problem of thermal stability of the nickel-based compound.

In order to solve such a problem, a method of changing a surface composition of a cathode active material in contact with an electrolyte using a method such as coating a surface, or the like, has been proposed. A coating amount for coating the cathode active material is as small as 1 to 2 wt % or less with respect to the cathode active material. A small amount of coating material forms a very thin film layer of about several nanometers to inhibit a side reaction with an electrolyte or, after the coating material is applied, it is heat-treated to form a solid solution on a surface of a particle to have a metal composition different from that of the inside of the particle. Here, the particle surface layer bonded with the coating material is as thin as tens of nanometers or less, and a significant difference in composition between the coating layer and the particle bulk reduces the effect when the battery is used for a long period of time by hundreds of cycles. Further, the effect of the battery is also reduced even by incomplete coating that the coating layer is not uniformly distributed on the surface.

In this connection, Korean Patent Laid-Open Publication No. 10-2005-0083869 discloses a lithium transition metal oxide having a concentration gradient of a metal composition. In this document, however, metal compositions of an internal layer and an external layer of a synthesized oxide are different, the metal compositions are not gradually changed in a generated cathode active material. This may be solved through a heat treatment process, but, at a high temperature of 850° C. or higher, a concentration gradient difference is rarely formed due to thermal diffusion of metal ions.

RELATED ART DOCUMENT

Patent Document (Patent document 1) Japanese Patent No. 3890185
(Patent document 2) European Patent No. 0 918 041
(Patent document 3) U.S. Pat. No. 6,040,090
(Patent document 4) Korean Patent Laid-Open Publication No. 10-2005-0083869

SUMMARY

An aspect of the present invention provides a novel compound in which a manganese (Mn) compound has a concentration gradient in a primary particle and a secondary particle, and a preparation method thereof.

According to an aspect of the present invention, there is provided a cathode active material for a secondary battery, including: a secondary particle formed as a plurality of primary particles cohere and including a manganese oxide on a surface portion of each of the primary particles.

The cathode active material for a secondary battery according to the present invention may include a manganese (Mn) oxide between the primary particles inside the secondary particle. The cathode active material for a secondary battery according to the present invention may include a Mn oxide even at a boundary between the primary particles constituting the secondary particle.

In the cathode active material for a secondary battery according to the present invention, a Mn concentration at the surface portion of the primary particle may be higher than a Mn concentration inside the primary particle.

In the cathode active material for a secondary battery according to the present invention, the Mn concentration of the primary particle may have a gradient from a central portion to the surface portion of the primary particle.

In the cathode active material for a secondary battery according to the present invention, the Mn oxide may be selected from the group consisting of Li2MnO3, LiMn2O4, MnO2, LiwMn2O4 (0<w<1), and Li2MnO3(1−v)LiMn2O4 (0<v<1). In the case of the cathode active material for a secondary battery according to the present invention, after an active material not including Mn is prepared, Mn is present on a surface of the secondary particle and inside the secondary particle, specifically, at the boundary between the primary particles in the secondary particle in the process of rinsing the active material with a solution including Mn, and thereafter, Mn is oxidized during sintering to form an Mn oxide. The cathode active material for a secondary battery according to the present invention includes the Mn oxide selected from the group consisting of Li2MnO3, LiMn2O4, MnO2, LiwMn2O4 (0<w<1), and Li2MnO3(1−v)LiMn2O4 (0<v<1) by a bonding ratio of Mn and oxygen (O).

The cathode active material for a secondary battery according to the present invention may have peaks at positions of (020), (003), (101), (006), (102), (104), (005), (009), (107), (018), (110), and (113) when XRD-analyzed.

The cathode active material for a secondary battery according to the present invention may have the peak (020) based on Li2MnO3 between 2θ=20° and 21° when XRD-analyzed.

The cathode active material for a secondary battery according to the present invention may have a peak of Li1−xMn2O4 between 2θ=36 and 38°, between 44 and 45°, and between 65 and 66°, when XRD-analyzed.

A peak intensity increase rate at the position (104) of the cathode active material for a secondary battery according to the present invention when XRD-analyzed after charging may be 3% or less, as compared with XRD analysis before charging.

The cathode active material for a secondary battery according to the present invention may include a lithium ion migration path arranged toward the center of the secondary particle in the primary particle.

The Mn oxide of the cathode active material for a secondary battery according to the present invention may be present within 1 μm from the surface of the secondary particle.

The cathode active material for a secondary battery according to the present invention may be represented by Chemical Formula 1 below.

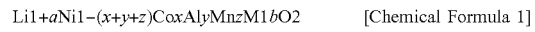

Li$_{1+a}$Ni$_{1-(x+y+z)}$Co$_x$Al$_y$Mn$_z$M1$_b$O$_2$ [Chemical Formula 1]

(Here, 0≤x≤0.1, 0≤y≤0.02, 0≤z≤0.0006, 0≤a≤0.1, 0≤b≤0.1 and M1 is one or more elements selected from the group consisting of Al, Ni, Mn, Cr, Fe, Mg, Sr, V, Zn, W, Zr, B, Ba, Sc, Cu, Ti, Co, a rare earth element, and combinations thereof).

According to another aspect of the present invention, there is provided a secondary battery including a cathode active material for a secondary battery.

According to another aspect of the present invention, there is provided a method for preparing a cathode active material for a secondary battery, including: a first operation of preparing a precursor including nickel and cobalt; a second operation of adding a lithium compound and an aluminum compound to the precursor and performing a heat-treatment on the mixture to prepare a composite metal compound; and a third operation of rinsing the prepared composite metal compound with a solution including manganese and drying the rinsed composite metal compound.

In the cathode active material for a secondary battery according to the present invention, the manganese oxide is present in the periphery of the primary particle, the manganese oxide forms a concentration gradient from a particle center to a particle surface in the secondary particle, and secondary battery including the cathode active material for a secondary battery according to the present invention has high safety, while exhibiting high capacity and high output.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION

Figure 1:
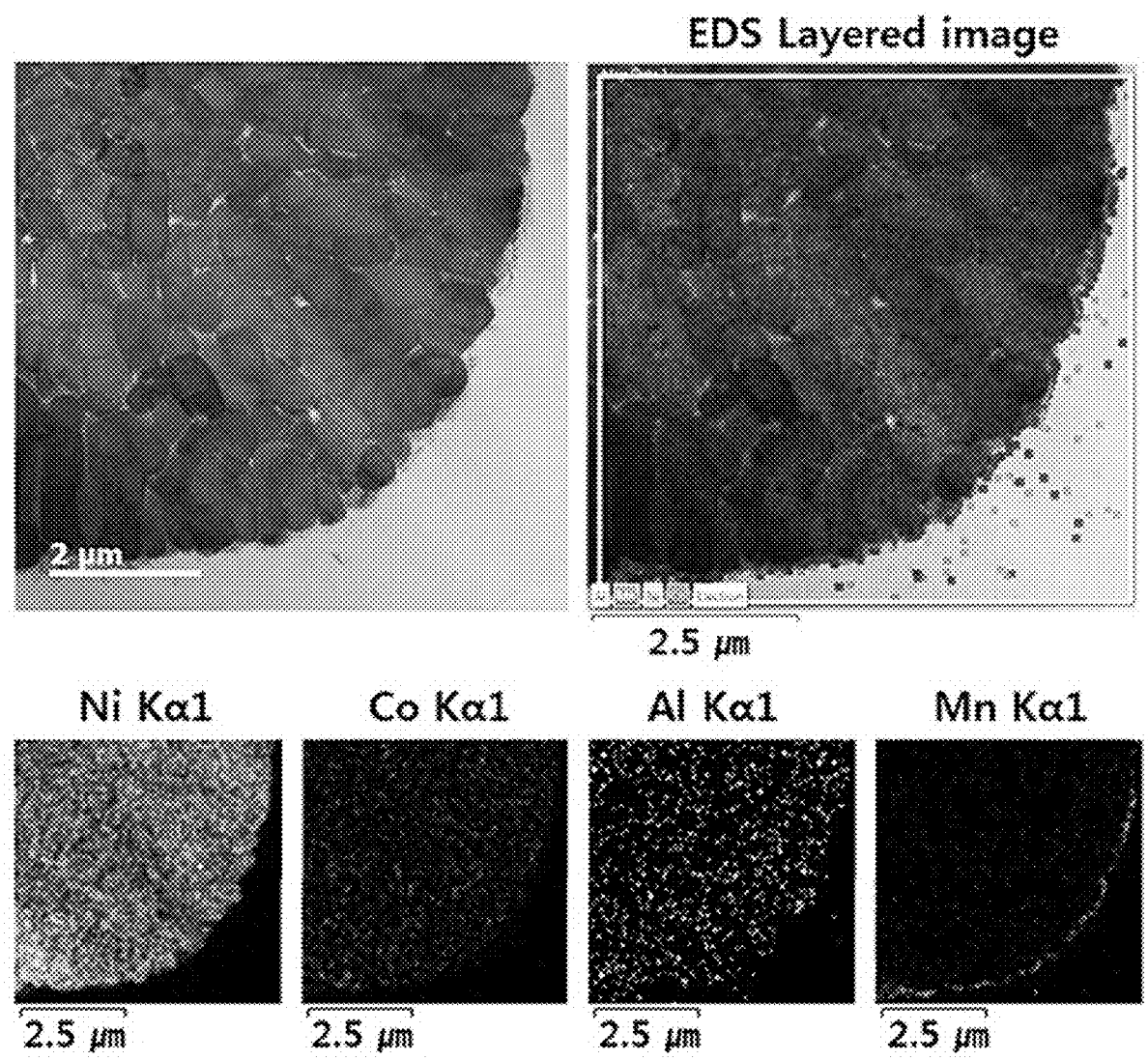
FIGS. 1 and 2 illustrate results of measuring metal concentrations of a cathode active material of a secondary battery prepared according to an embodiment of the present invention by an energy dispersive X-Ray spectroscopy (EDX).

Hereinafter, the present invention will be described in detail by the following embodiments. However, the following embodiments are merely illustrative and are not intended to limit the scope of the present invention. Any concept having substantially the same constitution and achieving the same operational effect as those of technical concept described in the claims of the present invention is included in the scope of the present invention.

Inventive Example 1. Preparation of Lithium Composite Oxide

A precursor represented by Ni0.98Co0.02(OH)2 was prepared by co-precipitation reaction. LiOH as a lithium compound and 1.4 mol of Al2O3 as an aluminum compound were added to the prepared precursor and heat-treated to prepare a cathode active material for a lithium secondary battery.

The prepared composite metal compound was rinsed with a washing solution containing 0.01 mol % of Mn and dried under the condition of 150° C. and 400 mmHg for 5 hours to prepare a cathode active material for a secondary battery represented by $Li_{1.01}Ni_{0.913}CO_{0.07}Al_{0.014}Mn_{0.0001}O_2$.

Inventive Example 2

A cathode active material for a secondary battery represented by Chemical Formula of $Li_{1.01}Ni_{0.912}C_{0.07}Al_{0.014}Mn_{0.0002}O_2$ was prepared under the same conditions and by the same method as those of Inventive Example 1, except that the prepared composite metal compound was rinsed with a washing solution containing 0.02 mol % of Mn.

Inventive Example 3

A cathode active material for a secondary battery represented by Chemical Formula of $Li_{1.01}Ni_{0.911}Co_{0.07}Al_{0.014}Mn_{0.0003}O_2$ was prepared under the same conditions and by the same method as those of Inventive Example 1, except that the prepared composite metal compound was rinsed with a washing solution containing 0.03 mol % of Mn.

Inventive Example 4

A cathode active material for a secondary battery represented by Chemical Formula of $Li_{1.01}Ni_{0.911}Co_{0.07}Al_{0.014}Mn_{0.0003}O_2$ was prepared under the same conditions and by the same method as those of Inventive Example 1, except that the prepared composite metal compound was rinsed with a washing solution containing 0.04 mol % of Mn.

Inventive Example 5

A cathode active material for a secondary battery represented by Chemical Formula of $Li_{1.01}Ni_{0.909}Co_{0.07}Al_{0.014}Mn_{0.0005}O_2$ was prepared under the same conditions and by the same method as those of Inventive Example 1, except that the prepared composite metal compound was rinsed with a washing solution containing 0.05 mol % of Mn.

Inventive Example 6

A cathode active material for a secondary battery represented by Chemical Formula of $Li_{1.01}Ni_{0.908}Co_{0.07}Al_{0.014}Mn_{0.0006}O_2$ was prepared under the same conditions and by the same method as those of Inventive Example 1, except that the prepared composite metal compound was rinsed with a washing solution containing 0.06 mol % of Mn.

Comparative Example 1. Preparation of a Lithium Composite Oxide not Rinsed with Manganese A lithium composite oxide represented by Chemical Formula $Li_{1.01}Ni_{0.914}Co_{0.07}Al_{0.014}O_2$ was prepared under the same conditions and by the same method as those of Inventive Example 1, except that it was immersed in a manganese-containing solution for rinsing.

TABLE 1

| Classification | Empirical Formula |
| --- | --- |
| Comparative Example 1 | $Li_{1.01}Ni_{0.914}Co_{0.07}Al_{0.014}O_2$ |
| Inventive Example 1 | $Li_{1.01}Ni_{0.913}Co_{0.07}Al_{0.014}Mn_{0.0001}O_2$ |
| Inventive Example 2 | $Li_{1.01}Ni_{0.912}Co_{0.07}Al_{0.014}Mn_{0.0002}O_2$ |
| Inventive Example 3 | $Li_{1.01}Ni_{0.911}Co_{0.07}Al_{0.014}Mn_{0.0003}O_2$ |
| Inventive Example 4 | $Li_{1.01}Ni_{0.91}Co_{0.07}Al_{0.014}Mn_{0.0004}O_2$ |
| Inventive Example 5 | $Li_{1.01}Ni_{0.909}Co_{0.07}Al_{0.014}Mn_{0.0005}O_2$ |
| Inventive Example 6 | $Li_{1.01}Ni_{0.908}Co_{0.07}Al_{0.014}Mn_{0.006}O_2$ |

<Experimental Example> EDX Measurement

Figure 2:
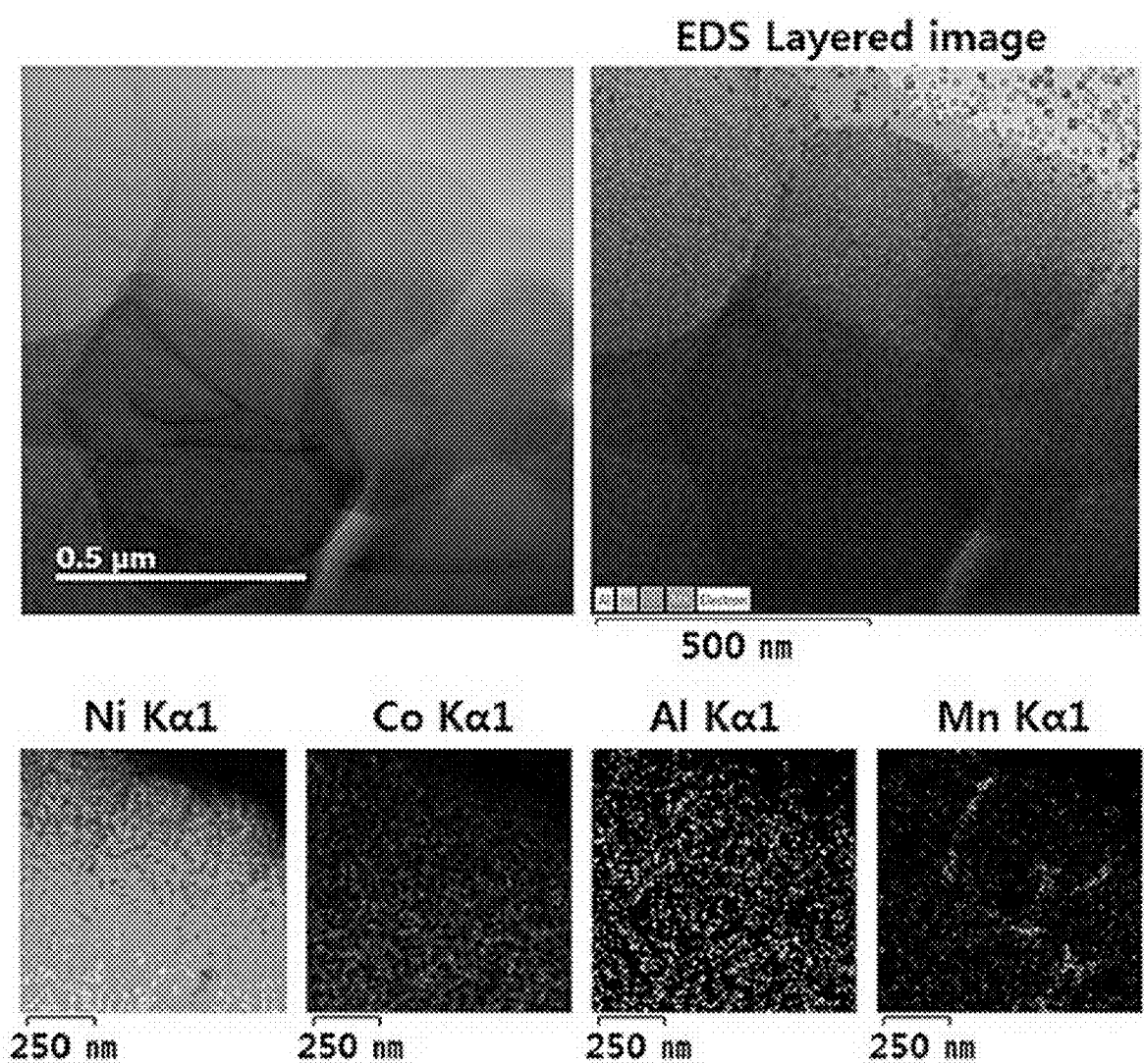

Concentrations of metals of the cathode active materials prepared in the above inventive examples were measured by an energy dispersive spectrometer (EDX) by varying measurement ratios and results thereof are illustrated in FIGS. 1 and 2.

In FIG. 1, in the case of the cathode active material of the present invention, which was rinsed with the Mn-containing solution, Mn was present on the surface of the secondary particle, and in FIG. 2 illustrating the cathode active material measured at an increased measurement ratio, it can be seen that Mn was present even in the boundaries between the primary particles present on the surface of the secondary particle.

<Experimental Example> Measurement of Metal Concentration in Particle

Figure 3:
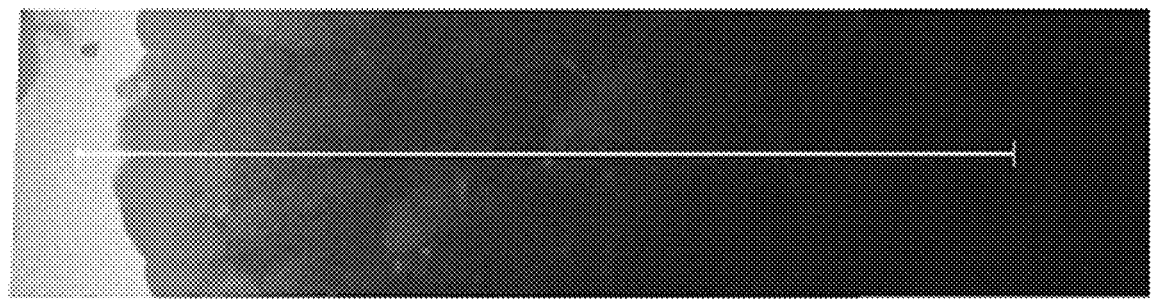
FIG. 3 illustrates results of measuring a metal concentration from a surface of particles to the center thereof in a cathode active material for a secondary battery according to an embodiment of the present invention.
Figure 3:
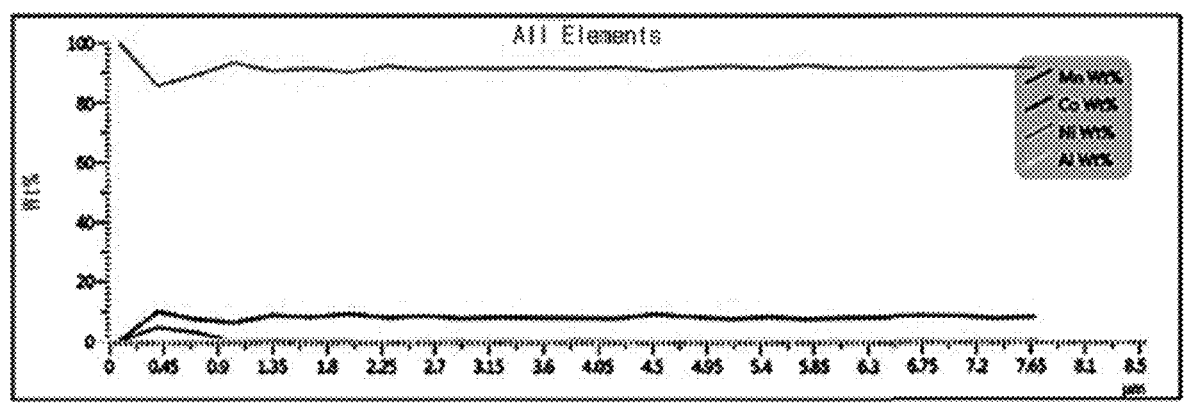
Figure 3:
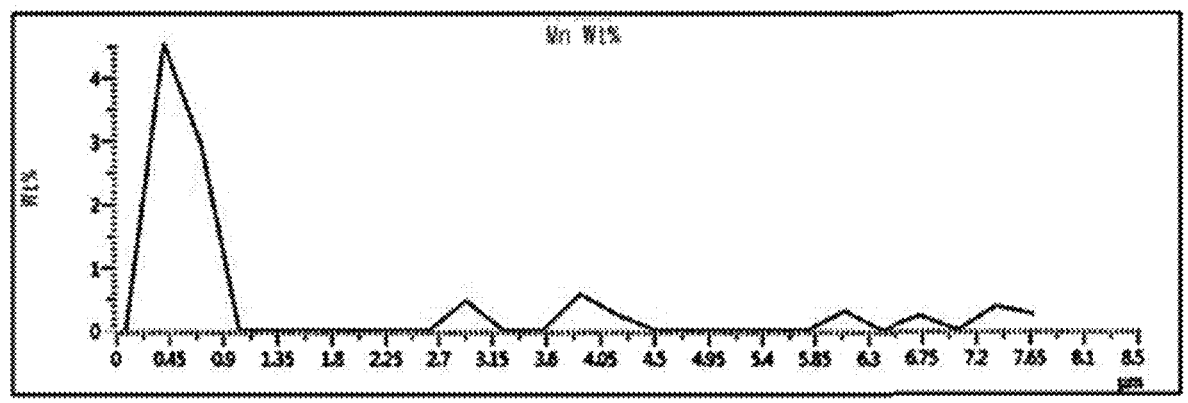

Changes in the concentrations of manganese, cobalt, nickel, and aluminum of the cathode active material for a secondary battery of Inventive Example 4 were checked from the surface of the secondary particle to the center of the secondary particle on the basis of TEM measurement results, and results thereof are illustrated in FIG. 3.

In FIG. 3, it can be seen that manganese was largely positioned within 1 µm from the surface of the secondary particle, has a maximum concentration of 5 wt % or less, and has a concentration gradient decreased from the surface to the center.

Figure 4:
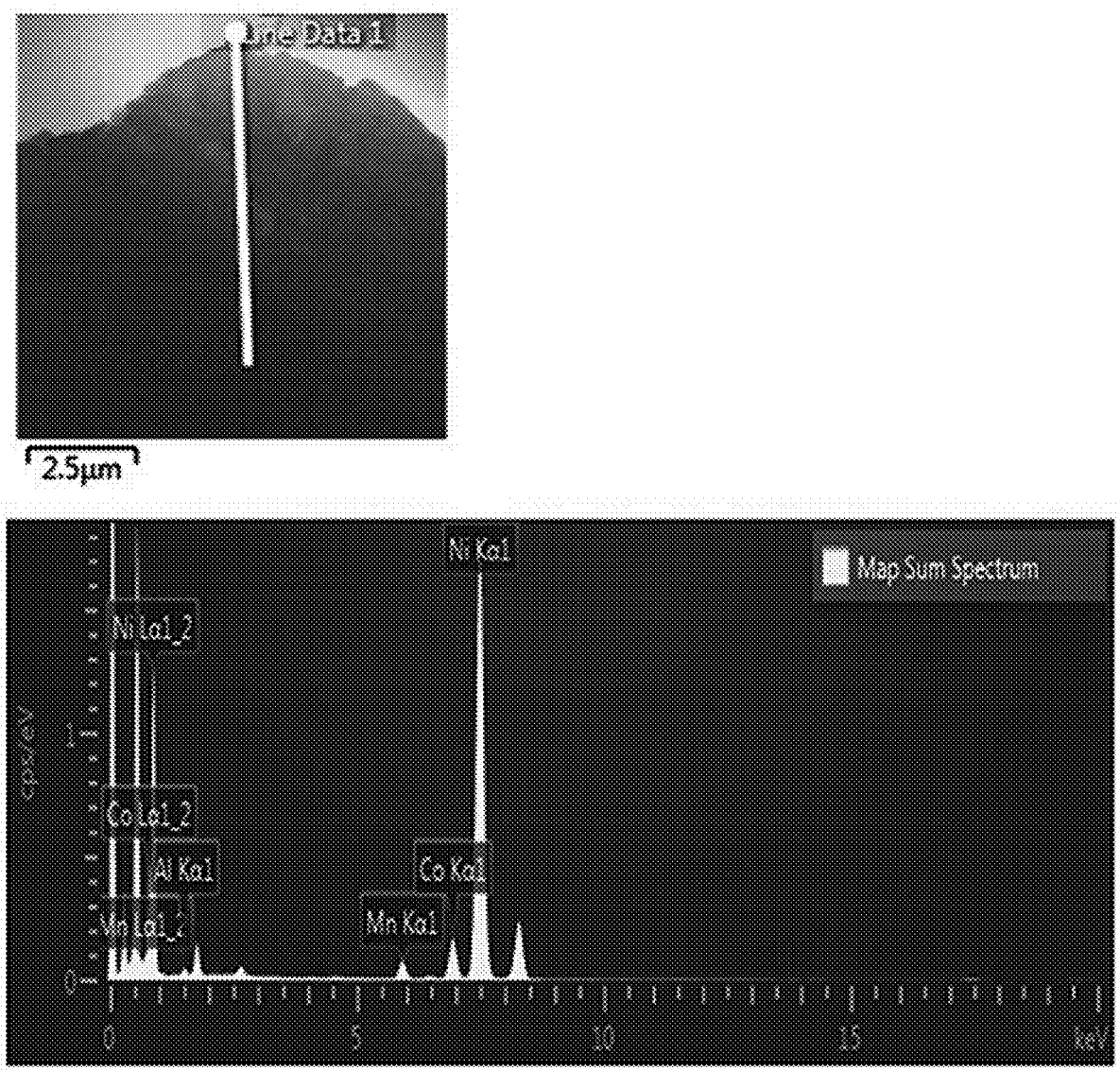
FIG. 4 illustrates results of measuring a metal concentration from a surface of particles the center thereof in a cathode active material for a secondary battery according to an embodiment of the present invention.

Weight percent (wt %) and atomic percent (at %) of manganese, cobalt, nickel, and aluminum in the TEM measurement range were measured and illustrated in Table 2 and FIG. 4.

TABLE 2

| Element | Weight percent (wt %) | Atom percent (at %) |
|---|---|---|
| Nickel | 91.35 | 90.98 |
| Cobalt | 8.06 | 7.99 |
| Aluminum | 0.37 | 0.8 |
| Manganese | 0.21 | 0.22 |
| Total | 100 | 100 |

<Experimental Example> Checking of Concentration Gradient of Mn

Figure 5:
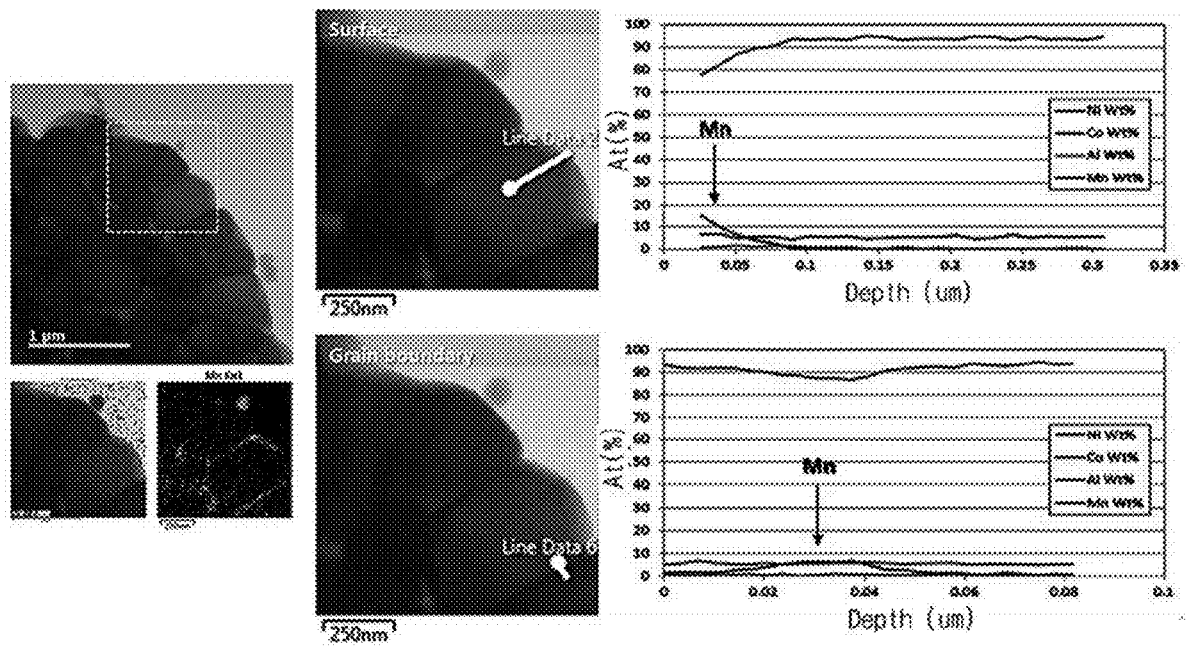
FIGS. 5 and 6 illustrate results of measuring a metal concentration from a surface of a secondary particle to the center thereof and from a boundary between primary particles to the inside of the primary particles in a cathode active material for a secondary battery according to an embodiment of the present invention.
Figure 6:
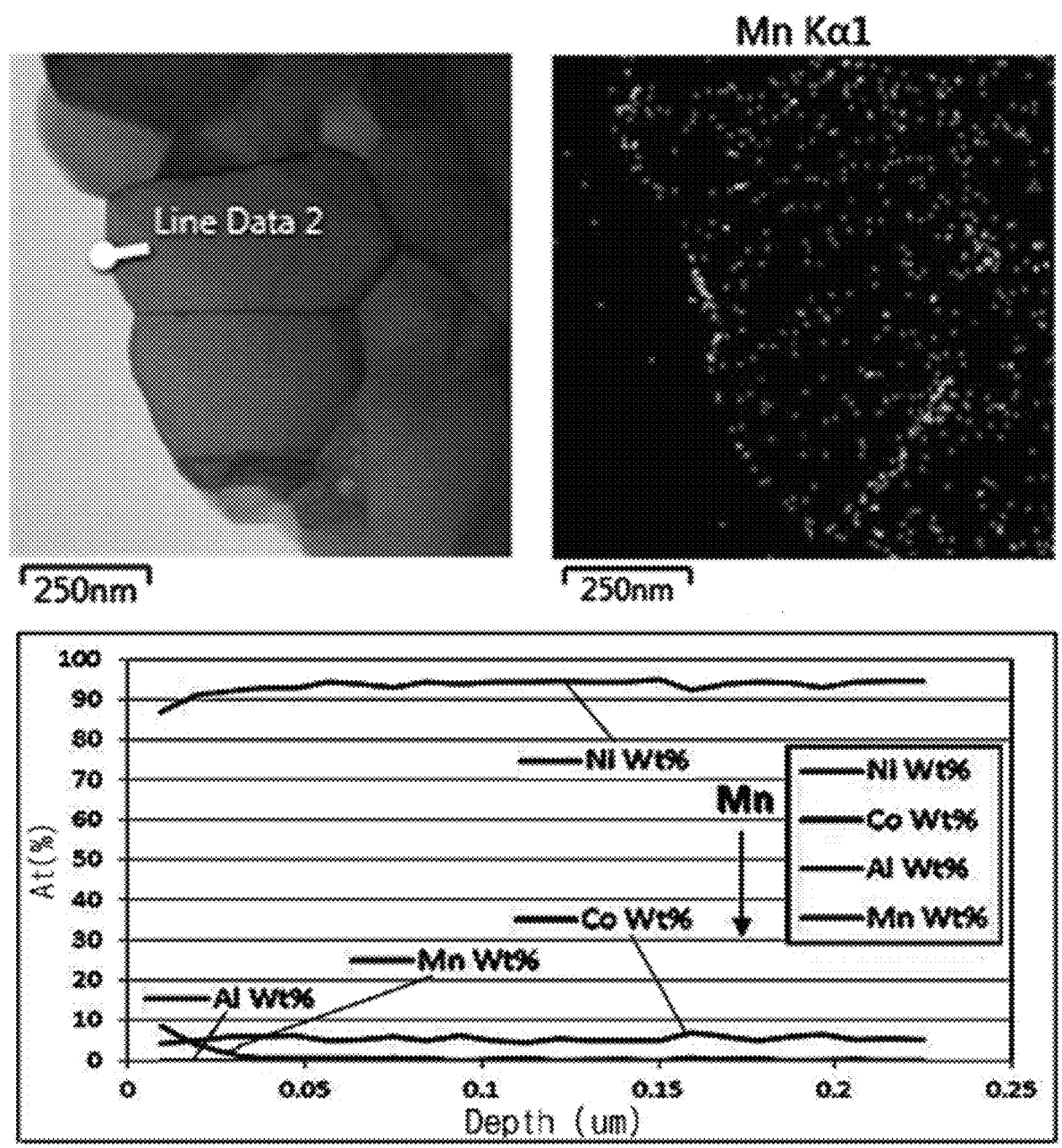

Changes in the concentrations of nickel, cobalt, aluminum and manganese included in the cathode active material for a secondary battery of Inventive Example 4 were measured on the surface of the secondary particle (surface, line data 2) and in a portion (grain boundary, line data 6) in contact with a boundary between the primary particles inside the secondary particle, and results thereof are illustrated in FIGS. 5 and 6. FIG. 6 is an enlarged view illustrating a result of measuring a concentration gradient from a surface of the secondary particle to the inside of the particle in FIG. 5.

In FIGS. 5 and 6, a concentration gradient appeared as the Mn concentration was decreased from the surface of secondary particle to the center thereof. Manganese was positioned within 1 µm from the surface of secondary particle and was not detected from the inside of the secondary particle.

As illustrated in FIG. 5, Mn was detected on the surface of the secondary particle and a boundary between the primary particles, i.e., a grain boundary. Mn was not detected from the inside of the primary particle, and a concentration gradient that the Mn concentration was decreased to the inside of the primary particle was observed.

<Experimental Example> XRD Measurement

Figure 7:
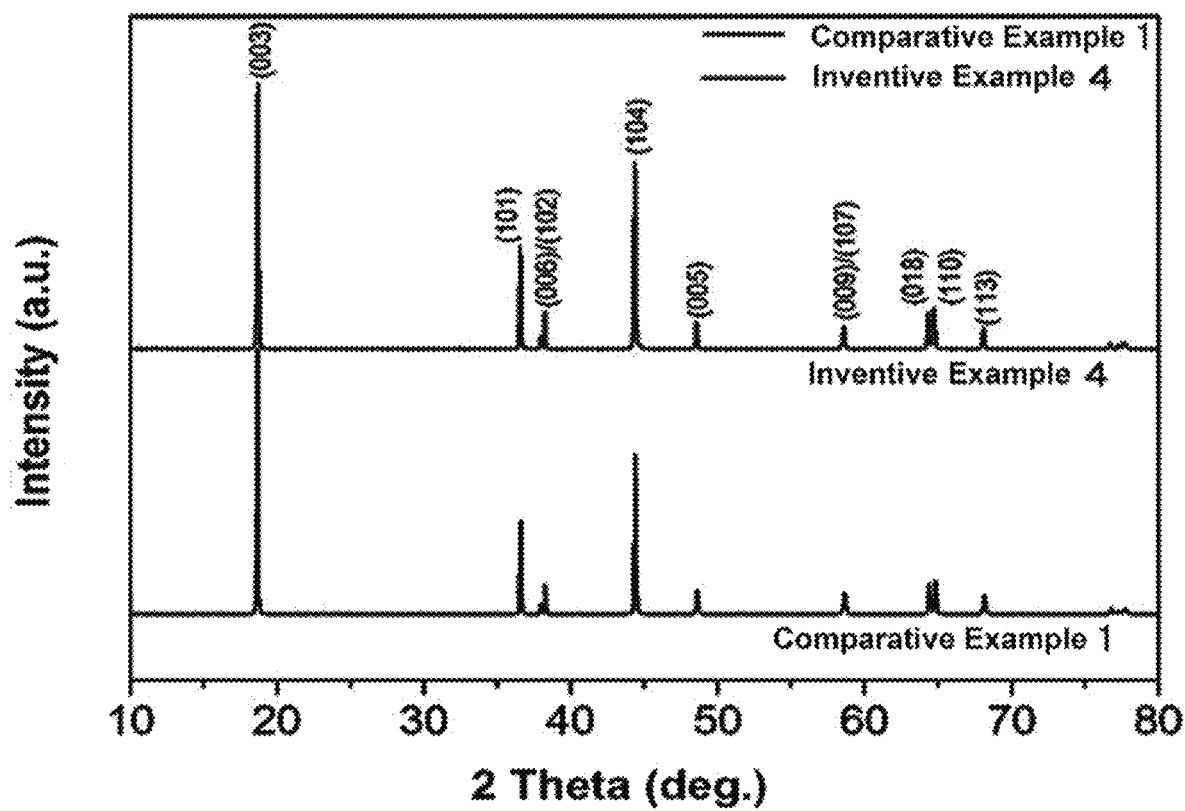
FIGS. 7 and 8 illustrate results of XRD measurements of a cathode active material for a secondary battery according to an embodiment of the present invention.
Figure 8:
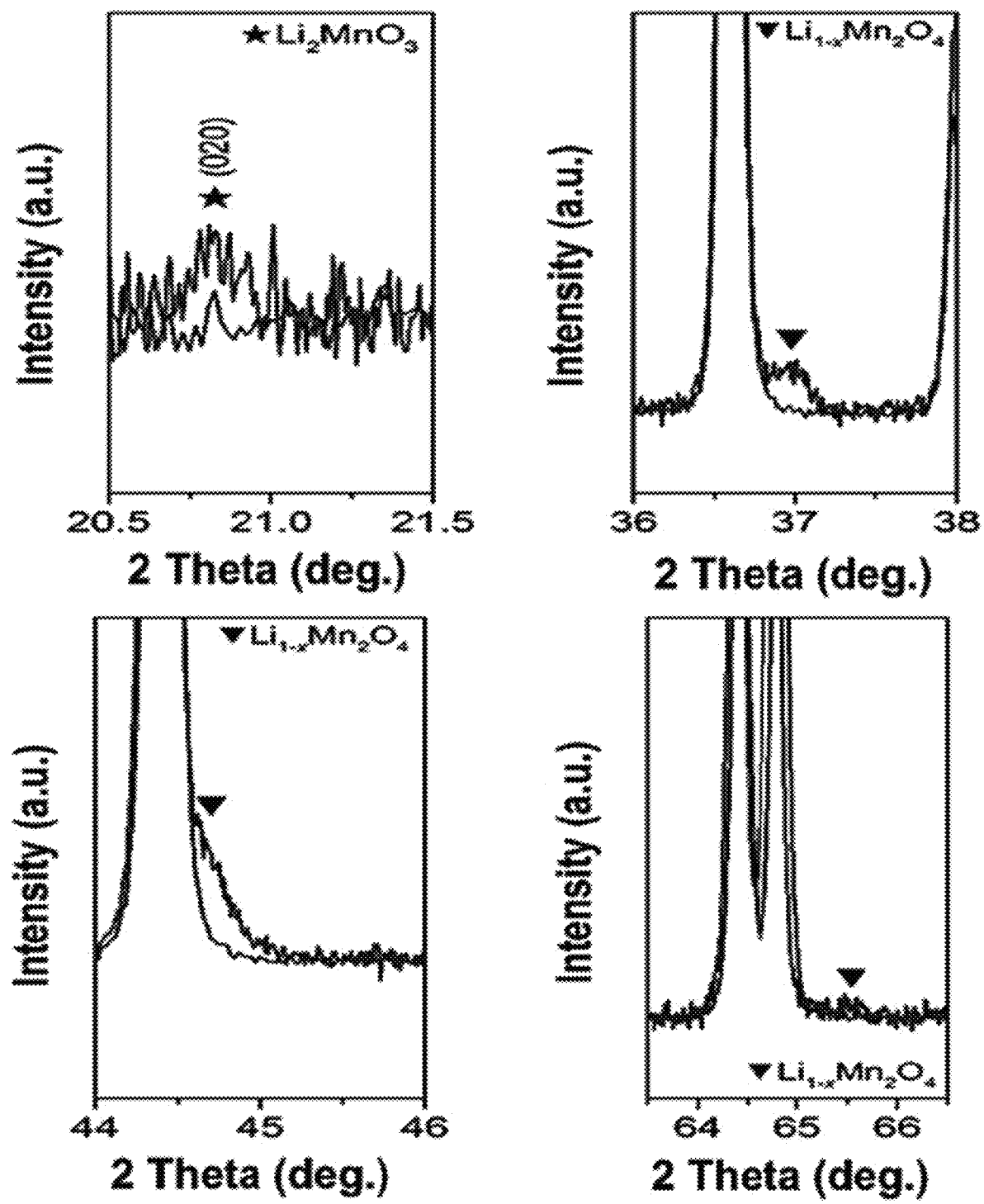

XRD measurement is made for the cathode active materials prepared in the above Inventive Examples and Comparative Example, and results thereof are illustrated in FIGS. 7 and 8.

In FIG. 7, in the case of the cathode active material of the present invention treated with the Mn-containing solution according to the embodiment of the present invention, the XRD analysis showed that peaks appeared at positions of (020), (003), (101), (006), (102), (104), (005), (009), (107), (018), (110), and (113).

In FIG. 8, in the case of the cathode active material of the present invention, it can be seen that the peak (020) based on Li2MnO3 appeared between 2θ=20° and 21° and the peak of Li1−xMn2O4 appeared between 2θ=36 and 38°, 44 and 45°, and 65 and 66°. That is, it was checked that, in the cathode active material coated with the manganese-containing solution according to the present invention, the manganese oxide exists in a spinel structure of Li2MnO3 and Li1−xMn2O4 which are different from a crystal structure of the cathode active material.

<Experimental Example> Checking of Migration Path of Lithium Ion

Figure 9:
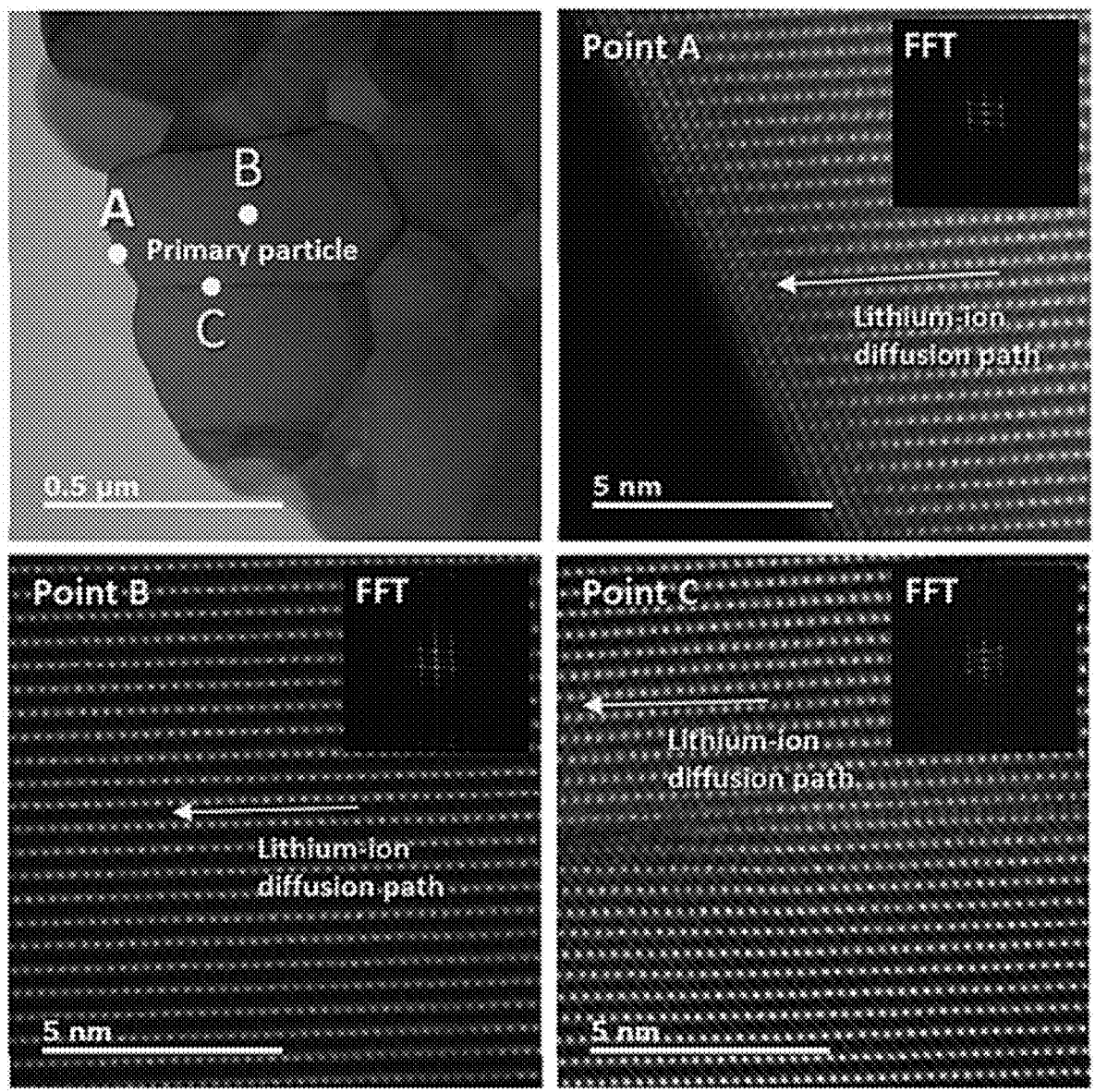
FIG. 9 illustrates results of checking diffusion paths of lithium ions present at various positions of primary particles in a cathode active material for a secondary battery according to an embodiment of the present invention.

A diffusion path of lithium ions according to respective positions of the primary particles of the cathode active material for a secondary battery of Inventive Example 4 was checked from TEM measurement data and is illustrated in FIG. 9. In FIG. 9, A represents a surface position of the secondary particle, B represents a central position of the primary particle, and C represents a boundary between the primary particles in the secondary particle.

In FIG. 9, it can be seen that, a lithium ion diffusion path is clearly present in the position B inside the particle and a crystal structure is distorted at lithium ion diffusion paths in the position A, the surface position of the secondary particle, and in the position C, which is a boundary between primary particles in the secondary particle.

at the A position which is the surface position of the secondary particle and the C position which is the boundary between the primary particles in the secondary particle.

<Experimental Example> Measurement of Residual Lithium

Residual lithium of the cathode active materials prepared in Inventive Examples 1 to 6 and the cathode active material prepared in Comparative Example were measured.

Specifically, 1 g of a lithium composite oxide was immersed in 5 g of distilled water and stirred for 5 minutes. After stirring, the lithium composite oxide was filtered to obtain a filtrate, to which 0.1 M of a HCl solution was added so as to be titrated to have pH 5. Here, the volume of the added HCl solution was measured to analyze residual lithium of the used cathode active material, and results thereof are illustrated in Table 3 below.

TABLE 3

| | Residual lithium (ppm) | | |
|---|---|---|---|
| Classification | LiOH | $Li_2CO_3$ | Total |
| Comparative Example 1 | 2,641 | 3,198 | 5,839 |
| Inventive Example 1 | 2,380 | 4,377 | 6,757 |
| Inventive Example 2 | 2,529 | 2,207 | 4,736 |
| Inventive Example 3 | 2,160 | 1,896 | 4,056 |
| Inventive Example 4 | 1,901 | 1,945 | 3,846 |
| Inventive Example 5 | 3,071 | 2,918 | 5,989 |
| Inventive Example 6 | 2,951 | 3,174 | 6,125 |

<Manufacturing Example> Manufacturing of Battery

Batteries were manufactured using the secondary battery cathode active materials prepared according to Inventive Examples 1 to 6 and Comparative Example 1.

First, the secondary battery cathode active material, a super-P as a conductive material, and polyvinylidene fluoride (PVdF) as a binder were mixed at a weight ratio of 95:5:3 to prepare a slurry. The prepared slurry was uniformly applied to an aluminum foil having a thickness of 15 μm and vacuum-dried at 135° C. to prepare a cathode for a lithium secondary battery.

A coin battery was manufactured using the obtained cathode for a lithium secondary battery, a lithium foil as a counterpart electrode, a porous polyethylene film Celgard LLC., Celgard 2300) having a thickness of 25 μm as a separator, and a solvent including LiPF6 having a concentration of 1.15 M as a liquid electrolyte and including a mixture of ethylene carbonate and ethylmethylcarbonate mixed in a volume ratio of 3:7.

Figure 10:
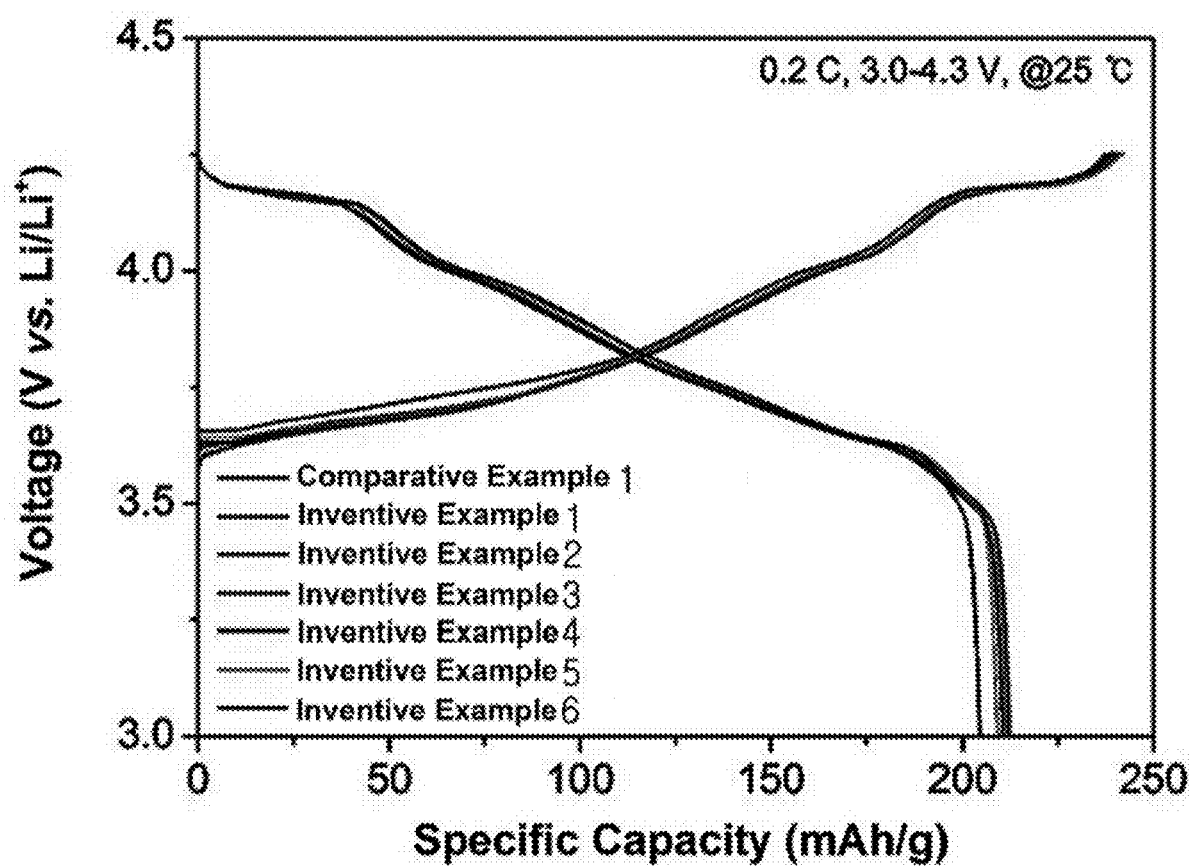
FIG. 10 is a graph illustrating an initial capacity of a battery manufactured using a cathode active material for a secondary battery according to an embodiment of the present invention.

<Experimental Example> Measurement of Battery Characteristics—Capacity Characteristics Initial capacities of the batteries respectively including the cathode active materials of the present invention and the cathode active material of comparative example manufactured in Manufacturing Example were measured, and results thereof are illustrated in FIG. 10 and Table 4.

TABLE 4

| Classification | 0.2 C Charge/discharge (3.0-4.3 V, 25° C.) | | |
|---|---|---|---|
| | Charge (mAh/g) | Discharge (mAh/g) | Efficiency (%) |
| Comparative Example 1 | 237.8 | 210.8 | 88.7 |
| Inventive Example 1 | 239.5 | 212.8 | 88.9 |
| Inventive Example 2 | 239.4 | 211.2 | 88.2 |
| Inventive Example 3 | 241.1 | 212.1 | 88.0 |
| Inventive Example 4 | 240.8 | 210.8 | 87.5 |
| Inventive Example 5 | 241.9 | 209.6 | 86.6 |
| Inventive Example 6 | 240.1 | 205.0 | 85.4 |

As illustrated in FIG. 10 and Table 4, the batteries manufactured using the cathode active materials of the present invention have excellent charge/discharge efficiency.

Figure 11:
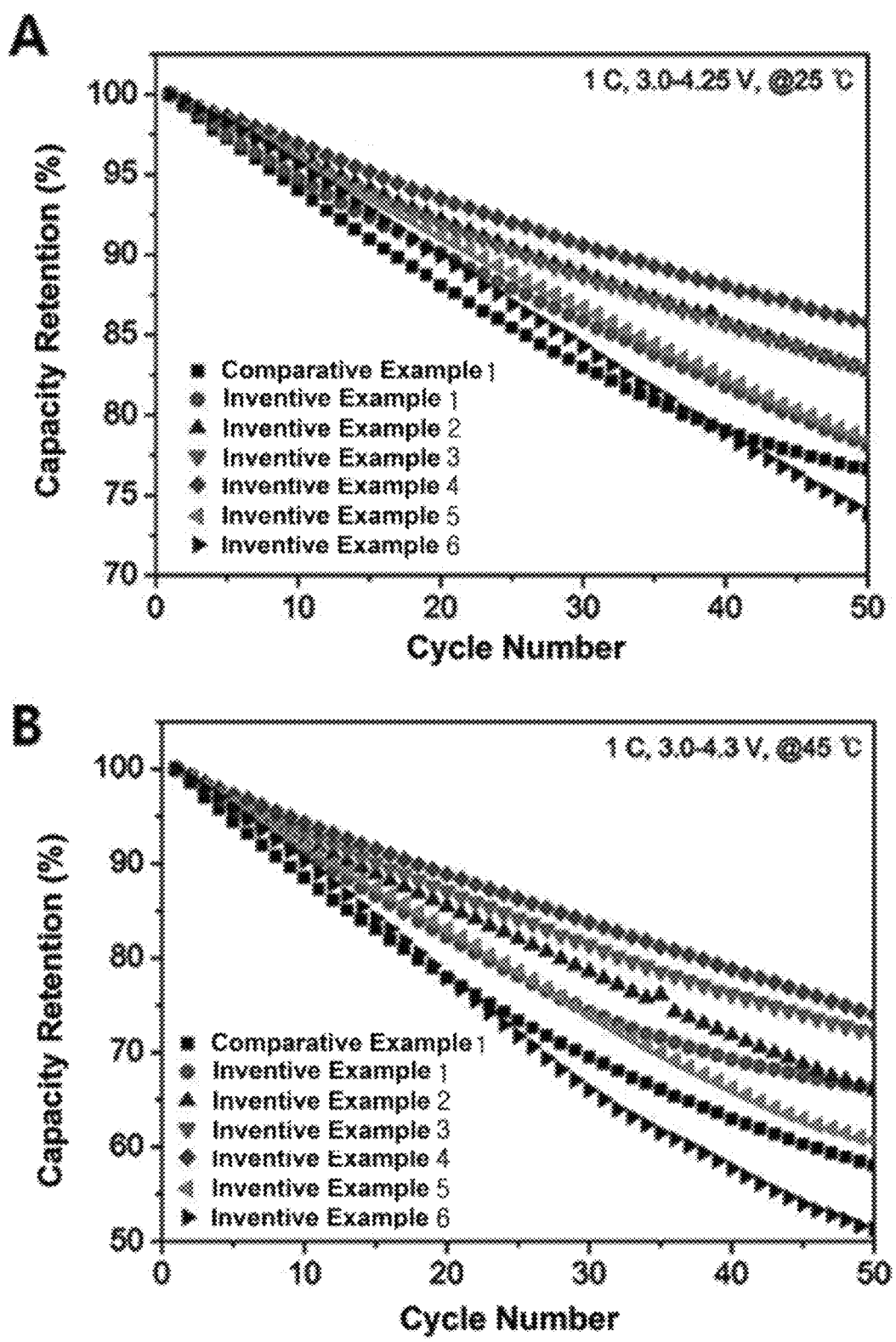
FIG. 11 is a graph illustrating a life time of a battery manufactured using a cathode active material for a secondary battery according to an embodiment of the present invention checked at room temperature (25° C.) (A) or high temperature (45° C.) (B).

<Experimental Example> Measurement of Battery Characteristics—Life Characteristics Life characteristics of the coin batteries were measured at room temperature (25° C.) and high temperature (45° C.), and results thereof are illustrated in FIG. 11 and Table 5.

TABLE 5

| | Maintaining Battery Life (50 times) | |
|---|---|---|
| Classification | Room temperature (%) | High temperature (%) |
| Comparative Example 1 | 76.7 | 58.5 |
| Inventive Example 1 | 78.1 | 66.3 |
| Inventive Example 2 | 82.7 | 66.6 |
| Inventive Example 3 | 82.9 | 72.0 |
| Inventive Example 4 | 85.8 | 74.0 |

TABLE 5-continued

| | Maintaining Battery Life (50 times) | |
|---|---|---|
| Classification | Room temperature (%) | High temperature (%) |
| Inventive Example 5 | 78.5 | 56.8 |
| Inventive Example 6 | 73.9 | 48.0 |

As illustrated in FIG. 11 and Table 5, the batteries manufactured using the cathode active materials for a secondary battery according to the present invention had better life characteristics than the battery of Comparative Example 1. In particular, the batteries manufactured using the secondary battery cathode active materials of Inventive Examples 2 to 4 were excellent in the effect of maintaining the battery life at a high temperature, as well as at room temperature.

Figure 12:
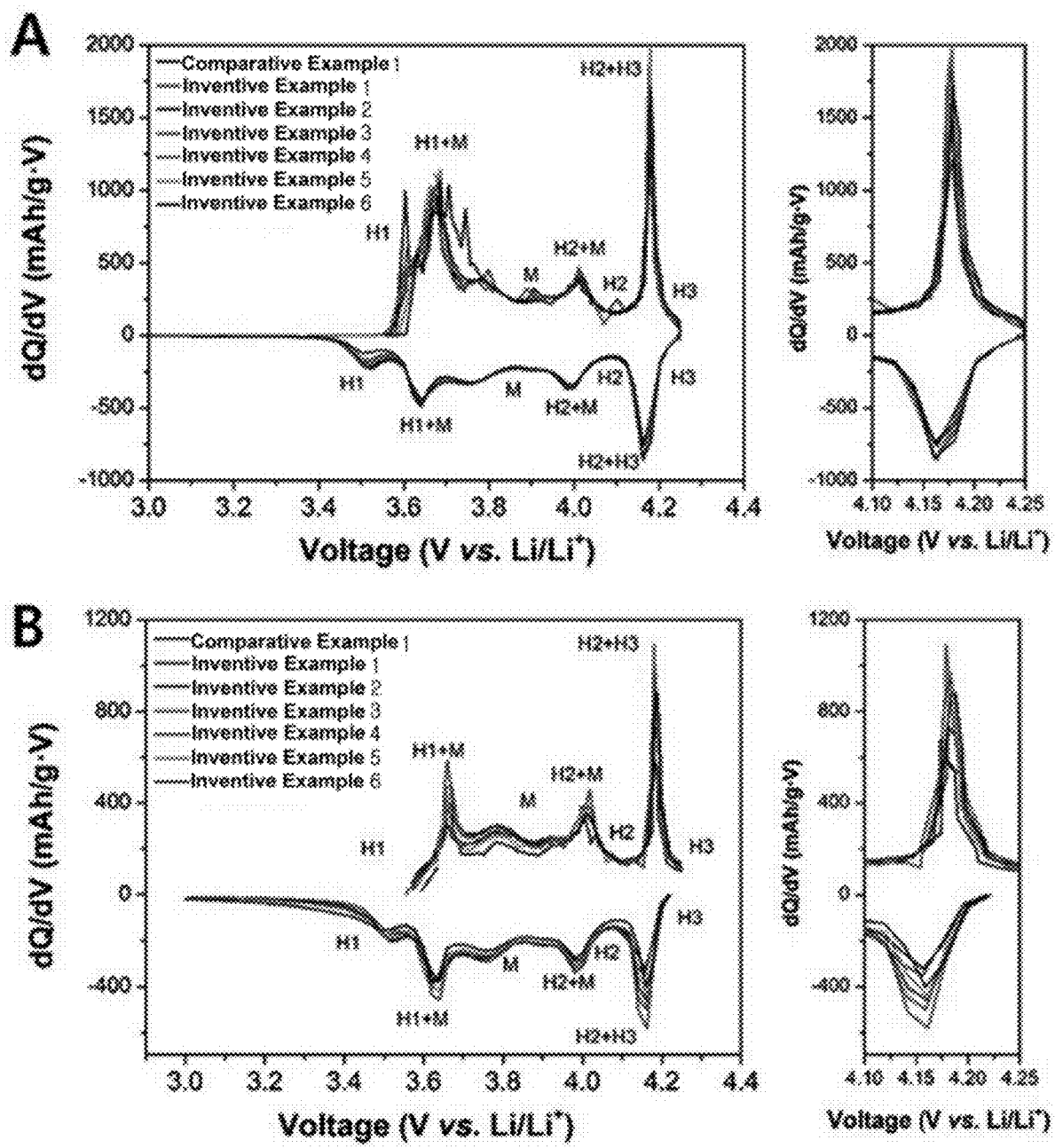
FIGS. 12 and 13 are graphs illustrating results of charge/discharge characteristics after a battery manufactured using a cathode active material for a secondary battery according to an embodiment of the present invention is charged and discharged for one time (A) and 50 times (B) at room temperature (25° C.).
Figure 13:
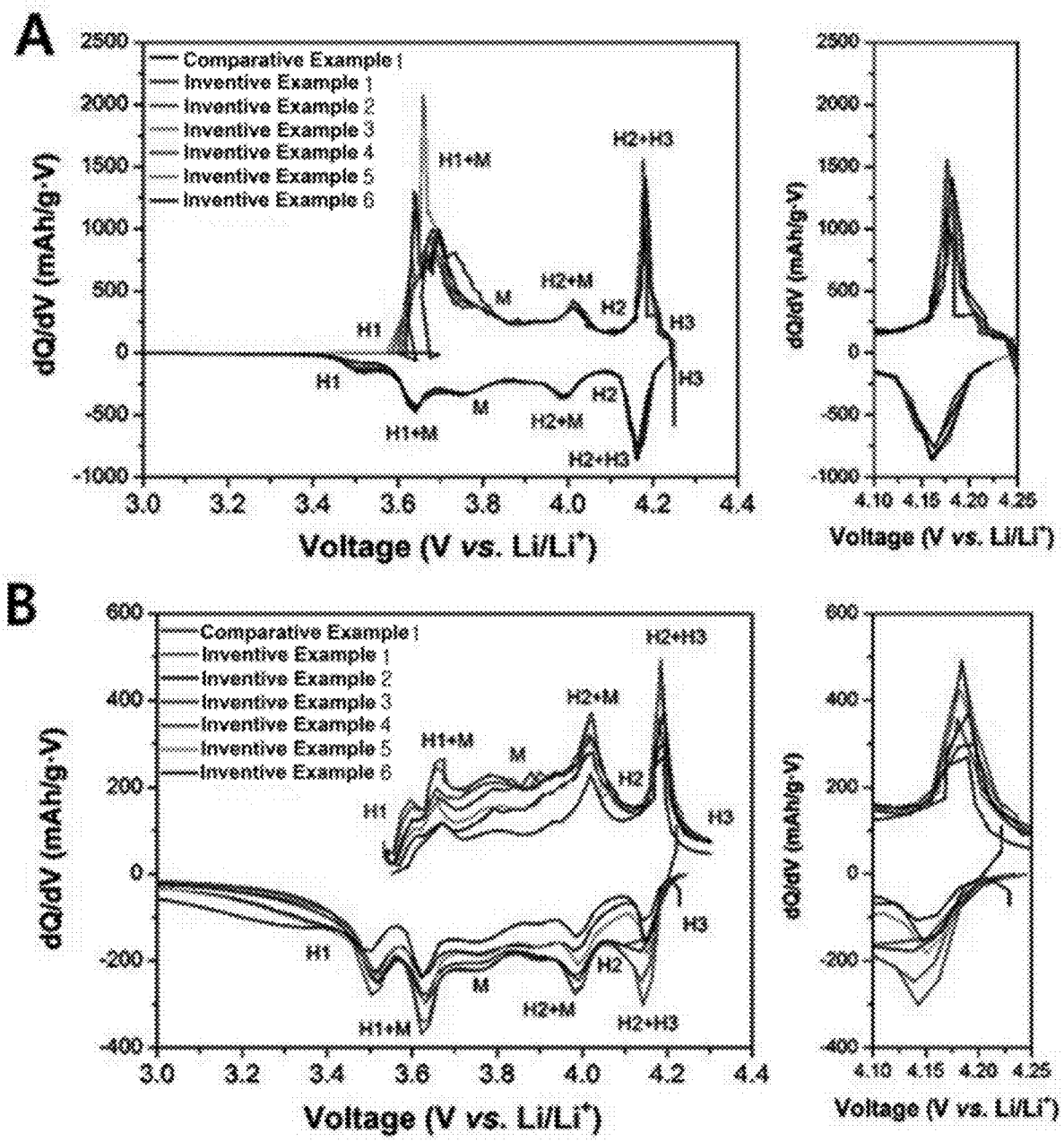

<Experimental Example> Measurement of Battery Characteristics—High Temperature Charge/Discharge Characteristics Charge//discharge characteristics when the coin batteries were charged/discharged one time or 50 times were measured at room temperature (25° C.) and a high temperature (45° C.), and results thereof were converted into dQ/dV to voltage (V) 12 and illustrated in FIGS. 12 and 13.

As illustrated in FIGS. 12 and 13, the batteries manufactured using the cathode active materials of the present invention has excellent charge/discharge characteristics even at a high temperature, as well as at room temperature.

<Experimental Example> XRD Measurement Before and after Charging/Discharging

After the coin batteries manufactured using the cathode active materials prepared in the Inventive Example and Comparative Example were charged/discharged 50 times, the coin batteries were disassembled, XRD Measurement was made on the obtained cathode active materials and compared with XRD data measured for the active materials before the batteries were manufactured. Results thereof are illustrated in FIG. 14 and Table 6.

TABLE 6

| | I(003)/I(104) | |
|---|---|---|
| | Comparative Example 1 | Inventive Example 4 |
| Before charge/discharge | 1.3064 | 1.3046 |
| After charge/discharge 50 times | 1.1533 | 1.1986 |
| Rate of increase of I(104) | 11.7% | 8.1% |

Figure 14:
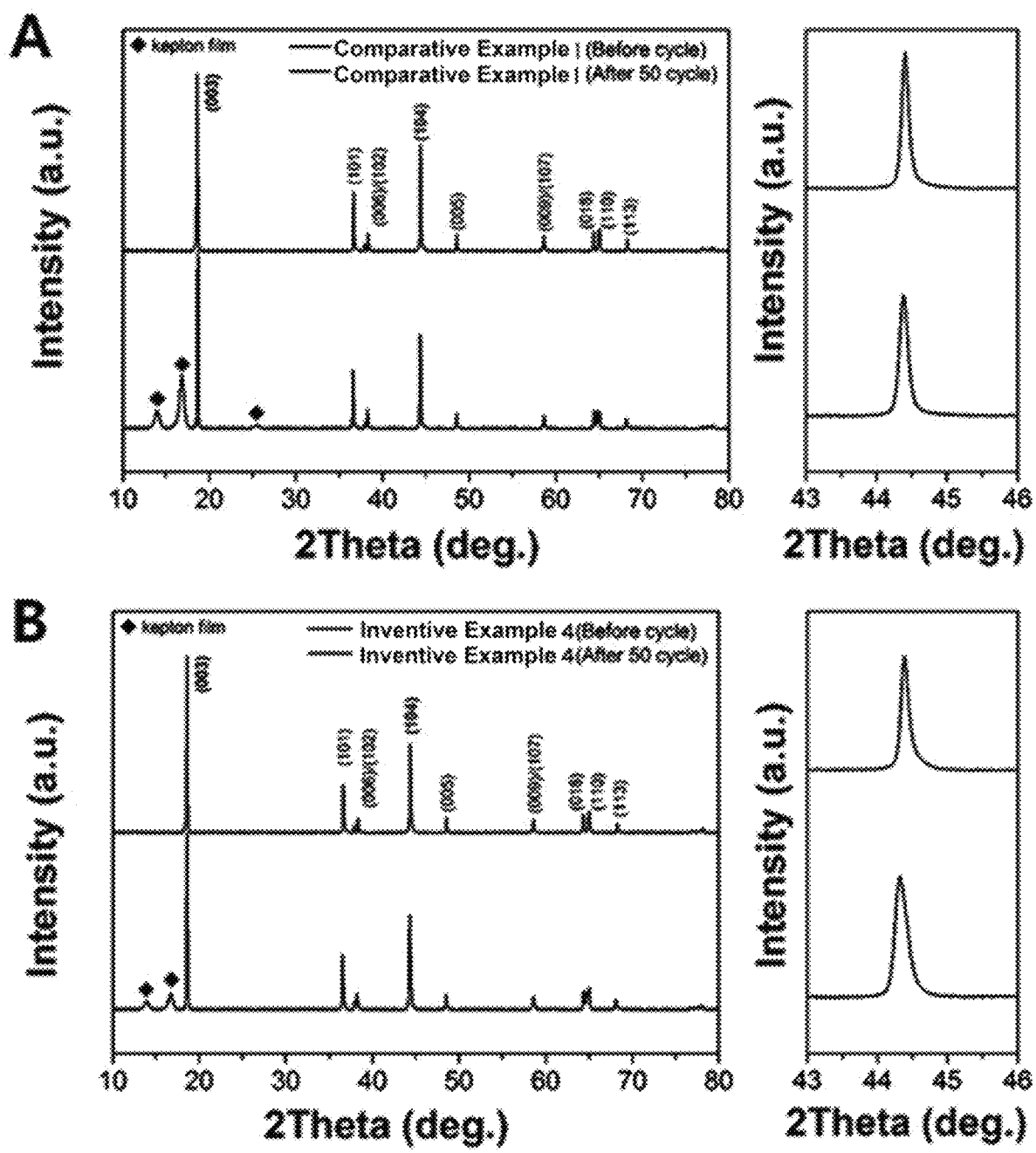
FIG. 14 illustrates results of X-ray diffraction (XRD) measurement of a cathode active material for a secondary battery according to an inventive example of the present invention and a comparative example 50 times before and after charging and discharging.

As illustrated in FIG. 14 and Table 6, as for the coin battery manufactured using the secondary battery cathode active material of Inventive Example 4 of the present invention, the value of 4104) thereof was changed by 5% or less even after charging and discharging 50 times, which is less than that of Comparative Example.

Figure 15:
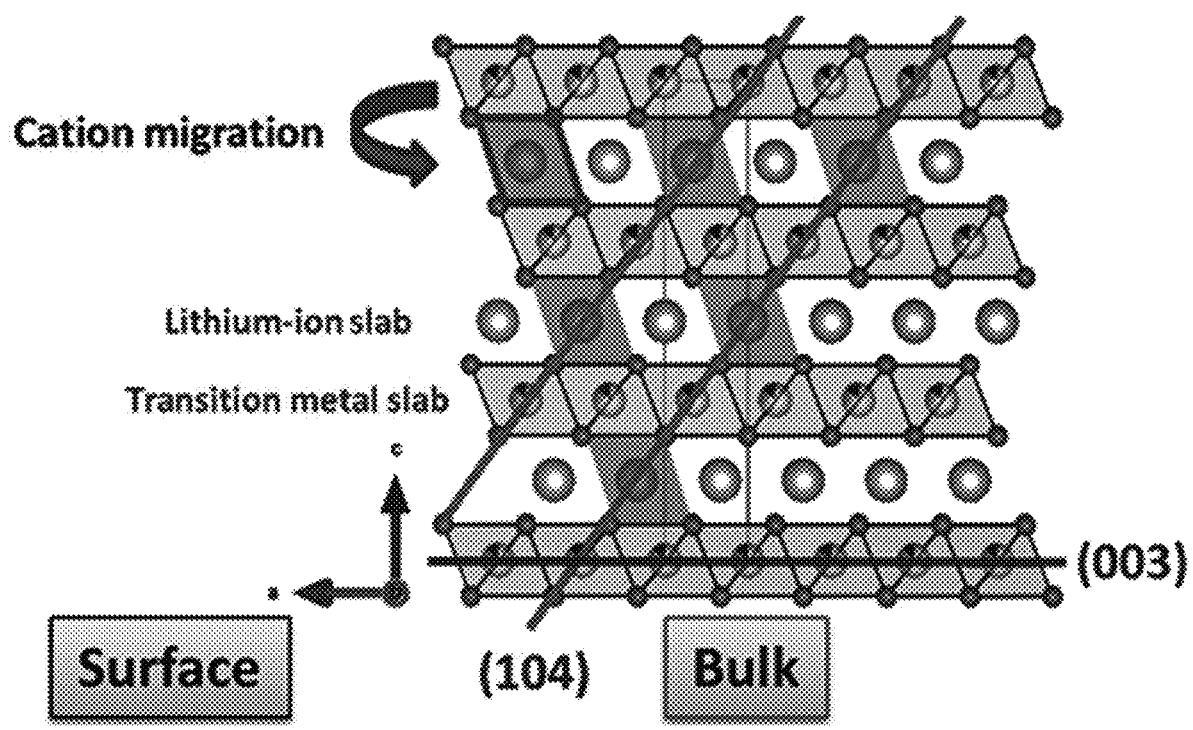
FIG. 15 is a schematic diagram illustrating cation migration generated due to charge and discharge in a layered type secondary battery.

In the case of a general battery, a crystal structure thereof deteriorates due to cation migration when the battery continues to be charged and discharged. As illustrated in FIG. 15, peak intensity at position (104) may be determined to indicate the extent of occurrence of cation migration.

In the case of the cathode active material of the present invention, it can be seen that, the increase in the value of 4104) was merely 2.61% even after charging/discharging was continuously performed, which indicates that the extent of deterioration of the bulk structure even after charging/discharging was reduced.

<Experimental Example> XPS Checking of Battery

Figure 16:
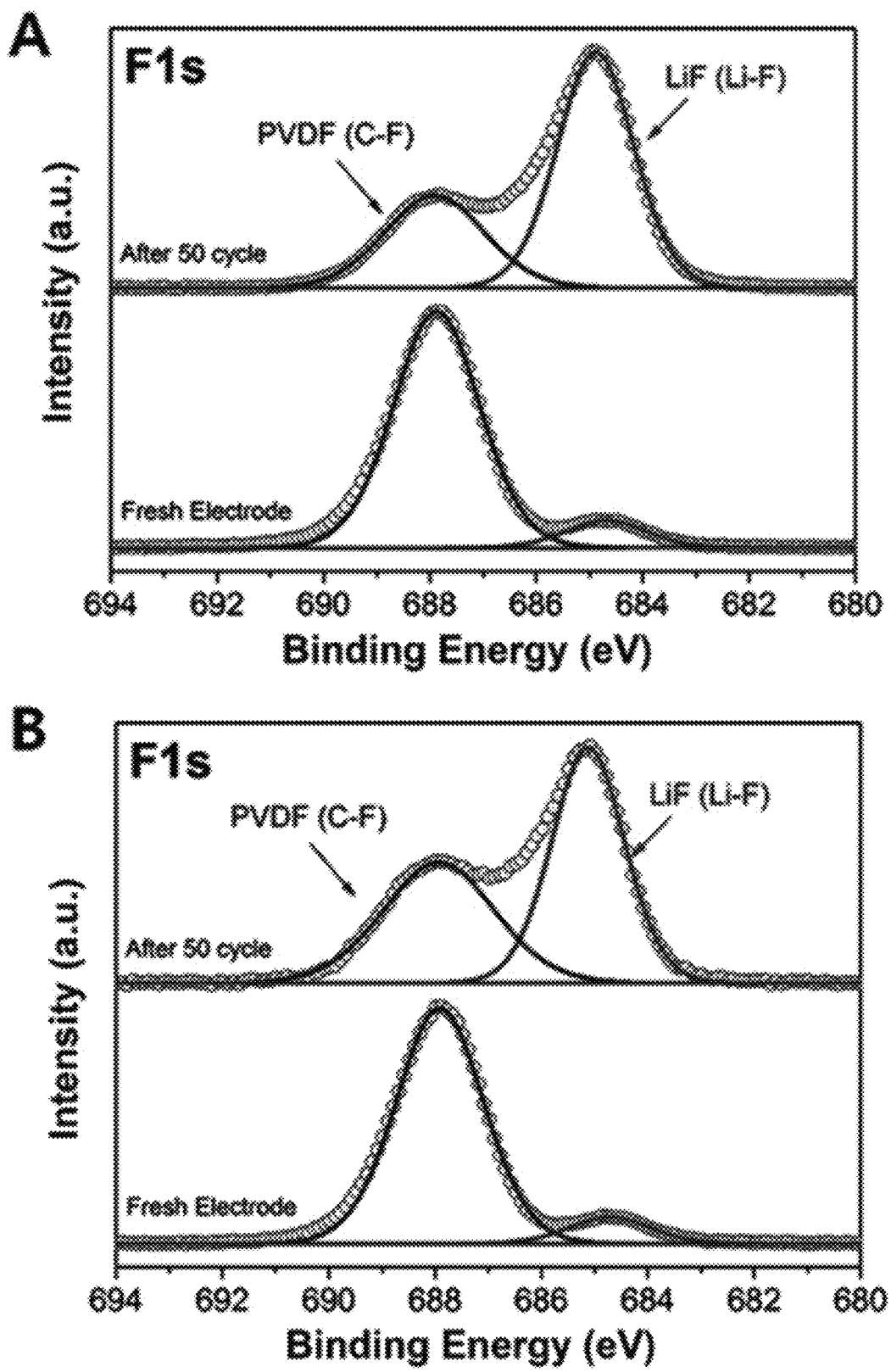
FIG. 16 are graphs illustrating the XPS of a secondary battery including a cathode active material for a secondary battery according to an inventive example (A) of the present invention and a comparative example (B) after 50 times of charging and discharging.
Figure 17:
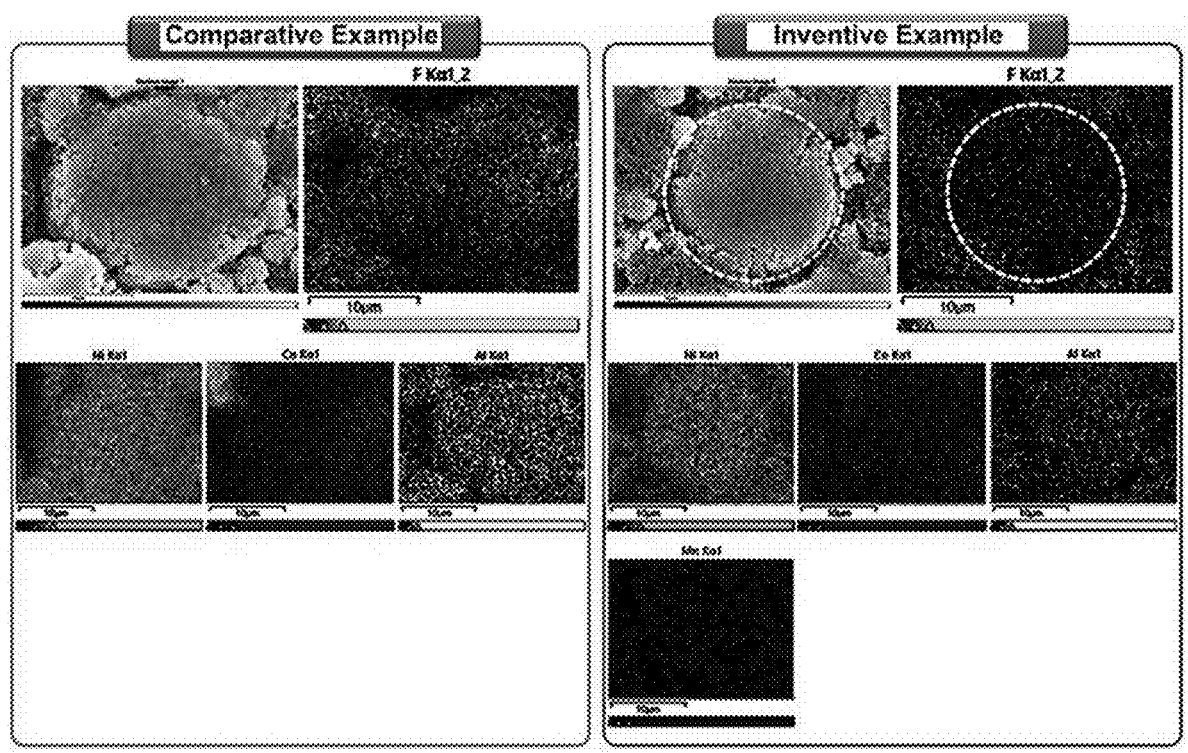
FIG. 17 illustrates results of measurement of Li—F in particles in a cathode active material for a secondary battery according to an embodiment of the present invention before and after 50 times of charging and discharging.

XPS of the coin battery manufactured using the secondary battery cathode active material of Inventive Example 4 and XPS of the coil battery manufactured using the secondary battery cathode active material prepared in Comparative Example 1 in Manufacturing Example, before and after charging and discharging 50 times, were measured, and results thereof are illustrated in FIGS. 16 and 17 and Table 7.

TABLE 7

| | Strength ratio I(C—F)/I(Li—F) | |
|---|---|---|
| | Comparative Example 1 | Inventive Example 4 |
| Before charge/discharge | 8.7032 | 8.6505 |
| After charge/discharge 50 times | 0.7682 | 0.7101 |
| Rate of increase of I(Li—F) | 8.8% | 8.2% |

In FIG. 16 and Table 7, in the case of the coin battery manufactured using the secondary battery cathode active material of Inventive Example 4 according to the present invention, I (Li—F), i.e., intensity of peak based on Li—F was decreased.

<Experimental Example> Measurement of LiF Formation in Cathode Active Material

The coin battery manufactured using the secondary battery cathode active material of Inventive Example 4 and the coin battery manufactured using the secondary battery cathode active material of Comparative Example 1 in Manufacturing Example were charged and discharged 50 times, cross-sections of the cathode active materials were measured by an EDX, and results thereof are illustrated in FIG. 17.

As illustrated in FIG. 17, it was checked that, in the case of the cathode active material of the present invention, Li—F in particles was detected to be less than that of Comparative Example.

While the present invention has been illustrated and described in connection with the embodiments, it will be apparent to those skilled in the art that modifications and variations can be made without departing from the spirit and scope of the invention as defined by the appended claims

What is claimed is:
1. A cathode active material for a secondary battery, the cathode active material comprising:
a secondary particle formed as a plurality of primary particles cohere and including a manganese oxide on a surface portion of each of the primary particles,
wherein a Mn concentration at the surface portion of the primary particle is higher than a Mn concentration inside the primary particle, and
wherein the cathode active material is represented by Chemical Formula 1 below:

$$Li_{1+a}Ni_{1-(x+y+z)}Co_xAl_yMn_zM1_bO_2 \qquad \text{[Chemical Formula 1]}$$

where $0<x\leq0.1$, $0\leq y\leq0.02$, $0<z\leq0.0006$, $0\leq a\leq0.1$, $0\leq b\leq0.1$ and M1 is one or more elements selected from the group consisting of Al, Ni, Mn, Cr, Fe, Mg, Sr, V, Zn, W, Zr, B, Ba, Sc, Cu, Ti, Co, a rare earth element, and combinations thereof.

2. The cathode active material of claim 1, wherein a manganese (Mn) oxide is present between the primary particles inside the secondary particle.

3. The cathode active material of claim 1, wherein the Mn concentration of the primary particle has a gradient from a central portion to the surface portion of the primary particle.

4. The cathode active material of claim 1, wherein the Mn oxide is selected from the group consisting of $Li_2MnO_3$, $LiMn_2O_4$, $MnO_2$, $Li_w$, $Mn_2O_4$ ($0<w<1$), and $Li_2MnO_{3(1-v)}LiMn_2O_4 (0<v<1)$.

5. The cathode active material of claim 1, wherein the Mn oxide is present within 1 μm from the surface of the secondary particle.

6. The cathode active material of claim 1, wherein the cathode active material has peaks at positions of (020), (003), (101), (006), (102), (104), (005), (009), (107), (018), (110), and (113) when XRD-analyzed.

7. The cathode active material of claim 1, wherein the cathode active material has the peak (020) based on $Li_2MnO_3$ between $2\theta=20°$ and $21°$ when XRD-analyzed.

8. The cathode active material of claim 1, wherein the cathode active material has a peak of $Li_{1-x}Mn_2O_4$ between $2\theta=36$ and $38°$, between 44 and $45°$, and between 65 and $66°$, when XRD-analyzed, where $0<x<1$.

9. The cathode active material of claim 1, wherein a peak intensity increase rate at the position (104) of the cathode active material when XRD-analyzed after charging is 3% or less, as compared with XRD analysis before charging.

10. The cathode active material of claim 1, wherein the cathode active material includes a lithium ion migration path arranged toward the center of the secondary particle in the primary particle.

11. A secondary battery including the cathode active material for a secondary battery according to claim 1.

* * * * *